United States Patent [19]

Zanzig et al.

[11] Patent Number: 5,723,530
[45] Date of Patent: Mar. 3, 1998

[54] TIRE WITH TREAD OF ELASTOMER COMPOSITION

[75] Inventors: David John Zanzig, Uniontown; Paul Harry Sandstrom, Tallmadge; Edward John Blok, Wadsworth, all of Ohio

[73] Assignee: The Goodyear Tire & Rubber Company, Akron, Ohio

[21] Appl. No.: 717,740

[22] Filed: Sep. 23, 1996

[51] Int. Cl.$^6$ .................................................. C08K 5/01
[52] U.S. Cl. .................................... 524/495; 525/237
[58] Field of Search ........................ 525/237; 524/495, 524/496

[56] References Cited

U.S. PATENT DOCUMENTS

| | | | |
|---|---|---|---|
| 4,518,434 | 5/1985 | Wilder | 524/496 |
| 4,721,749 | 1/1988 | Odar et al. | 525/237 |
| 4,786,680 | 11/1988 | Suzuki et al. | 524/496 |
| 4,843,120 | 6/1989 | Halasa et al. | 525/237 |
| 5,082,901 | 1/1992 | Linster | 525/237 |
| 5,229,459 | 7/1993 | Sandstrom et al. | 525/237 |

FOREIGN PATENT DOCUMENTS

| | | |
|---|---|---|
| 1161587 | 1/1984 | Canada. |
| 56-127651 | 10/1981 | Japan. |
| 56-127652 | 10/1981 | Japan. |
| 57-87441 | 5/1982 | Japan. |

*Primary Examiner*—Veronica P. Hoke
*Attorney, Agent, or Firm*—Henry C. Young, Jr.

[57] ABSTRACT

Pneumatic rubber tire with an outer, circumferential tread composed of selected elastomers with spatially defined glass transition temperatures, in conjunction with defined amounts of aromatic processing oil and reinforcing filler.

5 Claims, 1 Drawing Sheet

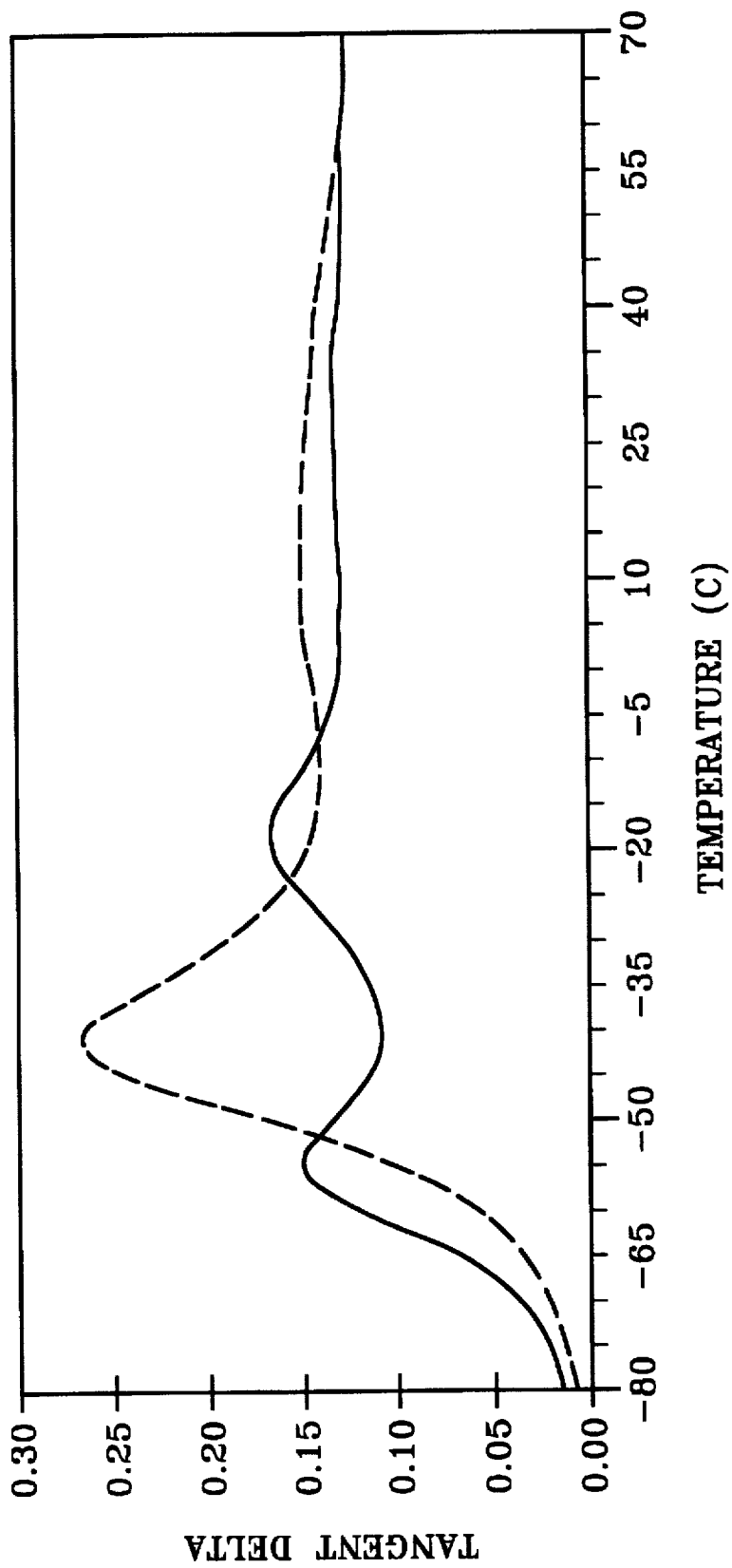

TIRE WITH TREAD OF ELASTOMER COMPOSITION

FIELD

This invention relates to a pneumatic rubber tire with an outer, circumferential tread composed of selected elastomers, reinforcing filler and oil.

BACKGROUND

Pneumatic rubber tires are conventionally prepared with a rubber tread which are typically composed of a blend of elastomers reinforcing filler and oil.

This invention is primarily directed to passenger vehicle tires where it is desired for the tire tread rubber composition to have a good balance of abrasion resistance and hysteresis properties.

Rubber compositions designed to specifically emphasize very good traction for a tire tread typically have relatively low abrasion resistance and associated relatively poor treadwear and typically have a relatively high, single, glass transition temperature (Tg) of above −50° C. and usually within a range of about zero to about −50° C. and also usually have a relatively high rubber processing oil content such as, for example, within a range of about 40 to about 100 phr.

In this endeavor, namely to provide a tread rubber composition with relatively high abrasion resistance, it is desired to provide such a tire tread rubber composition with materials, primarily known materials, brought together in a novel combination.

It is recognized that various diene-based elastomers, including individual polymers of isoprene and of butadiene and as well as copolymers of isoprene and/or butadiene either with each other or with vinyl aromatic materials such as, for example, styrene, have often been taught to be used in various tire tread compositions.

For example, cis 1,4-polyisoprene—both natural and synthetic, 3,4-polyisoprene, cis 1,4-polybutadiene, styrene/butadiene copolymer and isoprene/butadiene copolymer elastomers have been used, or have been suggested for use, in various combinations in tire tread compositions.

Terms such as "compounded rubber", "rubber compound" and "compound", if used herein, refer to rubber compositions composed of one or more elastomers blended with various ingredients, including curatives such as sulfur and cure accelerators. The terms "elastomer" and "rubber" might be used herein interchangeably. It is believed that all of such terms are well known to those having skill in such art.

A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined by a differential scanning calorimeter (DSC) at a temperature rate of increase of 10° C. per minute.

The existence of more than one glass transition temperature of a cured rubber composition can be determined by dynamic mechanical testing and demonstrated, for example, as a graphical representation, or plot, of tangent delta, or of low modulus (i.e. E") as a function of temperature. The existence of more than one glass transition temperature for the rubber composition is evident when at least two humps, or peaks, are present in the plot between the temperatures of −90° C. and 10° C.

DISCLOSURE AND PRACTICE OF THE INVENTION

In accordance with this invention, a pneumatic rubber tire is provided having a circumferential rubber tread where said tread is a rubber composition comprised of, based on 100 parts by weight of the tread rubber, (A) elastomers comprised of (i) about 20 to about 60, alternatively about 25 to about 40, phr of emulsion polymerization prepared, or organic solution polymerization prepared, styrene/butadiene having a styrene content in a range of about 30 to about 55, alternatively about 30 to about 50, percent and a Tg within a range of about −15° C. to about −45° C., (ii) about 5 to about 40, alternatively about 15 to about 30, phr of medium vinyl polybutadiene having a vinyl content in a range of about 40 to about 65 percent and a Tg within a range of about −45° C. to about −65° C., (iii) about 20 to about 40, alternatively about 20 to about 30, phr of cis 1,4-polybutadiene having a Tg within a range of about −95° C. to about −105° C. and (iv) about 5 to about 30, alternatively about 10 to about 30, phr of cis 1,4-polyisoprene having a Tg in a range of about −65° C. to about −70° C., (B) about 60 to about 110, alternatively about 65 to about 90, phr of high structure carbon black reinforcing filler characterized by having an Iodine adsorption value greater than 110, preferably greater than 115 and alternatively in a range of about 116 to about 135, g/kg together with a DBP number of greater than 110, preferably greater than 115 and alternatively in a range of about 125 to about 140, $cm^3/100$ g and (C) about 2 to about 30, preferably in a range of about 5 to about 25, phr of an aromatic processing oil having an aromaticity content of at least 35, and preferably within a range of about 35 to about 50, percent according to ASTM D2140; wherein the Tg of the lowest Tg elastomer is at least 50° C. lower than the Tg of the highest Tg elastomer.

It is an important aspect of this invention that the Tg of the lowest Tg elastomer, namely the cis 1,4-polybutadiene rubber, is at least 50° C. lower than the Tg of the highest Tg elastomer, namely the styrene/butadiene copolymer rubber. Preferably, in one aspect of the invention, at least 20, alternatively at least 25, weight percent of the elastomers have a Tg lower than −95° C., namely the cis 1,4-polybutadiene, and at least 20 weight percent of the elastomers have a Tg of higher than about −45° C., namely the styrene/butadiene copolymer.

This difference in spatially defined Tg's of the individual elastomers of at least 50° C. is considered important, and indeed one of the critical aspects of the invention, in order to provide for the rubber composition, is to have a good balance of relatively low abrasion resistance and relatively high hysteresis at low temperatures in a range of −35° C. to 0° C. for the hysteresis.

In this manner, it is considered herein that the relatively low Tg cis 1,4-polybutadiene elastomer is relatively incompatible with the high Tg styrene/butadiene copolymer elastomer as evidenced by their individual Tan. delta peaks on a graphical presentation, or plot, of Tan. delta versus temperature of the rubber composition within a temperature range of about −90° C. to about 10° C.

In particular, and as one aspect of this invention, a graphical plot of Tan. delta versus temperature curve within a range of −90° C. to 10° C. for the rubber composition of this invention yields two peaks in the curve with one peak having its apex within a temperature range of −90° C. to −50° C. and a second peak with its apex within a temperature range of −30° C. to 10° C.

Thus, evidence of the elastomer incompatibilities are the presence of dual Tan. delta peaks for the sulfur cured elastomer composition. The Tan. delta values, with the included peaks in their curves, can be determined by dynamic mechanical testing of the cured compound by procedures well known to those skilled in such art.

Thus, it is required that the cured compounded rubber composition exhibit at least two Tan. delta peaks within the aforesaid temperature range. This is considered significant because, for the cured compounded rubber, it is considered herein that a combination of the Tan. delta peak, at the lower temperature (e.g. −90° C. to −50° C.) for the low Tg elastomer, would suggest a promotion of improved abrasion resistance property (i.e. improved treadwear for a tire) together with the second Tan. delta peak, at the higher temperature (e.g. −30° C. to 10° C.) represented by the high Tg elastomer, would suggest a promotion of higher hysteresis at temperatures within a range of about −30° to about 0° C. (i.e. higher tire tread traction) property which is predictive of a better balance of such properties, particularly for a tire tread, than a cured rubber composition exhibiting a single Tan. delta peak within the aforesaid temperature range of −90° C. to 10° C.

A useful curing system for the elastomer composition is considered herein to be sulfur with a combination of hexamethylene tetramine and N-tert-butyl-2-benzothiazole sulfenamide cure accelerators. Here they have been observed to provide a good cure for passenger tire tread compounds claimed in this invention in a weight ratio of the tetramine to benzothiazole based accelerators in a range of about 0.6 to about 1.5. It is to be appreciated that additional accelerators can be used such as, for example, secondary accelerators as well as retarder(s) for the cure system for the rubber composition.

For such vulcanization system, usually about 0.7 to about 2.0 phr of sulfur might be used together with about 1.0 to about 3.5 phr of the combined accelerators.

In practice, the relatively high styrene-containing styrene/butadiene copolymer elastomer is considered herein to be important to enhance tire tread traction, hysteresis, or coefficient of friction, for the rubber composition. It is desired herein that the styrene content be at least 30 percent for the tire tread traction enhancement. Preferably, for such purposes, the styrene/butadiene copolymer is prepared by emulsion polymerization.

Use of the specified medium vinyl polybutadiene elastomer is considered herein to be important in order to provide a good balance of abrasion resistance and hysteresis for the rubber composition. It is desired that the vinyl content be in the range of 40–65 percent.

Use of the specified cis 1,4-polybutadiene elastomer is considered herein to be important in order to enhance abrasion resistance.

Use of the specified cis 1,4-polyisoprene, preferably natural rubber, is considered herein to be important in order to enhance compound processability with minimum processing oil and processing additives which are considered herein to adversely offset abrasion resistance.

The addition of the cis 1,4-polyisoprene natural rubber is also considered herein to be important to contribute to tear resistance property for the tread rubber composition.

Use of rubber reinforcing carbon black(s) for this invention, with the characterized Iodine adsorption value range and DBP number range, is considered herein to be important in order to provide good abrasion resistance, or coefficient of friction and also enhanced, or relatively high hysteresis for relatively good traction for a tire tread.

Representative of such rubber reinforcing carbon blacks are, for example, N121 and N205. All of such representative carbon blacks have an Iodine adsorption number within a range of about 110 to about 145 g/kg and a DBP number in a range of about 110 to about 140 cm$^3$/g. Examples of reinforcing carbon blacks for elastomers, generally, together with their Iodine number values and DBP (dibutyl phthalate) absorption values, may be found in The Vanderbilt Rubber Handbook, (1990), 13th edition, pages 416–419.

Use of the specified aromatic rubber processing oil is considered herein to be important in order to provide rubber processability and hysteresis for traction.

A typical characteristic of such aromatic rubber processing oil is, for example, an aromaticity content of at least 35 percent with the remainder of the oil primarily being of a combination of paraffinic and naphthenic content. An aromatic oil with an aromatic content of at least about 35 percent and a range of about 35 to about 50 percent is contemplated. Thus, even though the aromatic content may be less than the majority, although usually at least 35 percent, it is still referred to as an aromatic oil. Typically, for rubber compounding purposes, rubber processing oils might be divided into three categories, namely, paraffinic oils containing less than 20 percent aromaticity which might be the most common naphthenic oils containing less than 20 percent aromaticity and aromatic oils which contain at least 40 percent aromaticity according to ASTM D2140. Often, the paraffinic, naphthenic and aromatic oils are a blend of all three oils. Thus, while the aromatic processing oil is required herein to contain the aromatic component, the remainder of the oil is typically composed of paraffinic and naphthenic components. Also, an oil referred to as a paraffinic rubber processing oil may be expected to also contain naphthenic and/or aromatic components, and a processing oil referred to as a naphthenic or paraffinic/naphthenic oil may also contain an aromatic component, although it is expected that the aromatic content will be below 30 percent and probably below 20 percent. All of such oils are well known to those having skill in such art for rubber compounding purposes.

For this invention, the aromatic rubber processing oil with the relatively high aromatic content is required instead of paraffinic rubber processing oil or naphthenic rubber processing oil with its lower aromatic content because of its better compatibility with the claimed rubber composition and, more specifically, styrene/butadiene copolymer elastomer, the high Tg elastomer component of the rubber composition.

In the practice of this invention, use of the specific combinations of the aforesaid elastomer blend and rubber additives and curatives are considered herein to be important in order to optimize abrasion resistance (treadwear) and hysteresis (i.e. traction).

Indeed, it is considered herein that the utilization of the selected and combined elastomers, in combination with a relatively low aromatic oil content, for passenger tire treads, to provide an incompatible elastomer blend as defined by a sulfur cured elastomer composition having the two Tan. delta peaks, is significant, is believed to be novel and is believed to be a departure from using typical blends of elastomers with one Tan. delta peak cured elastomer composition within a temperature range of about −90° C. to about 10° C., utilizing the defined elastomers having Tg's spaced apart by at least 50° C.

In the further practice of this invention, while maintaining the aforesaid basic synthetic elastomer composition, it is envisioned herein that the tread rubber composition may contain a very minor amount of about 5 to about 15 phr of at least one additional diene based synthetic elastomer.

Such additional synthetic diene based elastomers can be, for example, trans 1,4-polybutadiene with a Tg in a range of about −70° C. to about −85° C.

In practice, it is preferred that the elastomers utilized in the tread composition, including both the other and the additional elastomers, are exclusive of polymers and copolymers of isobutylene, including halogen modifications thereof.

As hereinbefore pointed out, the invention is based upon use of elastomers which are usually known, carbon blacks and rubber processing oils in what is considered herein as a novel combination as to (i) selection of specific individual materials, and (ii) combining the selected specific materials in novel combinations in terms of individual amounts in a manner not believed to be specifically heretofore used for a tire tread. This aspect of the invention is considered particularly important for creating a tire tread rubber composition with good abrasion properties coupled, also, with good traction, or coefficient of friction, or hysteresis, properties. This aspect of the invention is especially directed to its more narrowly defined aspects which is restated, in its narrower form as follows:

While it is considered that a tire tread rubber is conventionally reinforced with a particulate carbon black reinforcing filler, it is recognized that, for some tire applications, silica reinforcement may also be desired. In such case, about 5 to about 30 phr of silica might be used so long as the weight ratio of carbon black to silica is at least about 2 to 1.

The commonly employed siliceous pigments used in rubber compounding applications are usually precipitated siliceous pigments (referred to herein as silica).

The siliceous pigments employed may be precipitated silicas such as, for example, those obtained by the acidification of a soluble silicate, e.g., sodium silicate.

The BET surface area of the silica, as measured using nitrogen gas, may, for example, be in a range of about 50 to about 300, alternatively about 120 to about 200, square meters per gram. A BET method of measuring surface area is described in the *Journal of the American Chemical Society*, Volume 60, page 304 (1930).

The silica may also have a dibutylphthalate (DBP) absorption value in a range of about 100 to about 400, and usually about 150 to about 300.

The silica might be expected to have an average ultimate particle size, for example, in a range of about 0.01 to 0.05 micron as determined by the electron microscope, although the silica particles may be even smaller in size.

Various commercially available silicas may be considered for use in this invention such as, for example, only and without limitation, silicas commercially available from PPG Industries under the Hi-Sil trademark with designations 210, 243, etc; silicas available from Rhone-Poulenc, with designations of Zeosil 1165MP and silicas available from Degussa AG with designations VN2 and VN3, etc.

When silica reinforcement is used for a rubber tire tread, the silica is conventionally used with a coupling agent, or what is sometimes referred to as a reinforcing agent Compounds capable of reacting with both the silica surface and the rubber elastomer molecule in a manner to cause the silica to have a reinforcing effect on the rubber, many of which are generally known to those skilled in such art as coupling agents, or couplers, are often used. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents may, for example, be composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface, possibly through hydrolysis, and the rubber reactive component of the coupling agent combines with the rubber itself.

Numerous coupling agents are taught for use in combining silica and rubber such as, for example, silane coupling agents containing a polysulfide component, or structure, such as bis-(3-triethoxysilylpropyl) tetrasulfide.

It is readily understood by those having skill in the art that the rubber compositions of the tread would be compounded with conventional compounding ingredients including the aforesaid reinforcing fillers such as carbon black, as hereinbefore defined, possibly an addition of a minor amount of precipitated silica, usually, in combination with a silica coupling agent, as well as antidegradant(s), processing oil as hereinbefore defined, stearic acid or a zinc stearate, zinc oxide, sulfur-contributing material(s) and vulcanization accelerator(s) as hereinbefore defined.

Such compounding of rubber is well known to those having skill in such art. Antidegradants are typically of the amine or phenolic type. While stearic acid is typically referred to as a rubber compounding ingredient, it may be pointed out that the ingredient itself is usually obtained and used as a mixture of organic acids primarily composed of stearic acid with at least one of oleic acid, linolenic acid and palmitolic and/or palmitic acid normally contained in the stearic acid as typically used. The mixture may contain minor amounts (less than about six weight percent) of myristic acid, arachidic acid and/or arachidonic acid. Such material or mixture is conventionally referred to in the rubber compounding art as stearic acid.

Where normal or typical rubber compounding amounts or ranges of amounts of such additives are used, they are not otherwise considered as a part of the invention. For example, some of the ingredients might be classified, in one aspect, as processing aids. Such processing aids may be, for example, waxes such as microcrystalline and paraffinic waxes typically used in a range of about 1–5 phr and often in a range of about 1 to about 3 phr; and resins, usually as tackifiers, such as, for example, synthetic hydrocarbon and natural resins typically used in a range of about 1–5 phr and often in a range of about 1 to about 3 phr. A curative might be classified as a combination of sulfur and sulfur cure accelerator(s) for the rubber compound (usually simply referred to as accelerator) or a sulfur donor/accelerator. In a sulfur and accelerator(s) curative, the amount of sulfur used is in a range of about 0.5 to about 5 phr and usually in a range of about 0.5 to about 3 phr; and the accelerator(s), often of the sulfenamide type, is (are) used in a range of about 0.5 to about 3 phr and often in a range of about 1 to about 2 phr. However, the preferred cure system of sulfur and accelerators has already hereinbefore been defined.

The ingredients, including the elastomers but exclusive of sulfur and accelerator curatives, are normally first mixed together in a series of at least two sequential mixing stages, although sometimes one mixing stage might be used, to a temperature in a range of about 145° C. to about 180° C., and such mixing stages are typically referred to as non-productive mixing stages. Thereafter, the sulfur and accelerators, and possibly one or more retarders and one or more antidegradants, are mixed therewith to a temperature of about 90° C. to about 120° C. and is typically referred as a productive mix stage. Such mixing procedure is well known to those having skill in such art.

After mixing, the compounded rubber can be fabricated such as, for example, by extrusion through a suitable die to form a tire tread. The tire tread is then typically built onto a sulfur curable tire carcass and the assembly thereof cured in a suitable mold under conditions of elevated temperature and pressure by methods well-known to those having skill in such art. In such case of retreading of a tire, the tire tread might first be precured and then applied to the already cured tire carcass with a curable gum strip between the tread and carcass and the assembly then submitted to curing conditions to cure the aforesaid gum strip.

The invention may be better understood by reference to the following example in which the parts and percentages are by weight unless otherwise indicated.

EXAMPLE I

Mixtures of diene rubber compositions were prepared comprised of recipes shown in Table 1 as Experiments A, B, C and D. Experiment A is considered a control and Experiments B, C and D utilize blends of high styrene containing styrene/butadiene rubber, medium vinyl polybutadiene, cis 1,4-polybutadiene and natural rubber elastomers together with specified carbon black and aromatic oil and accelerators.

TABLE 1

| Material | Exp A (Cntrol) | Exp B | Exp C | Exp D |
|---|---|---|---|---|
| Styrene/butadiene elastomer[1] | 96.25 | | | |
| Medium vinyl polybutadiene[2] | | 34.38 | 34.38 | 34.38 |
| Cis 1,4- polybutadiene[3] | 37.50 | | | |
| Cis 1,4- polybutadiene[4] | | 25 | 25 | 25 |
| E-SBR[5] (40% BS) | | 27.50 | | |
| E-SBR[6] (36% BS) | | | 27.50 | |
| E-SBR[7] (52% BS) | | | | 20 |
| Natural Rubber[8] | | 30 | 30 | 30 |
| Carbon Black[9], N205 | 70 | | | |
| Carbon black, N121[10] | | 70 | 70 | 60 |
| Processing oil (aromatic)[11] | 10 | 5 | 5 | 5 |
| Sulfur | 1.5 | 1.0 | 1.0 | 1.0 |
| Accelerators[12] | 1.5 | | | |
| Accelerators[13] | | 1.8 | 1.8 | 1.8 |

Conventional, preferred, amounts of antidegradant(s) (para-phenylene diamine type), tackifying resin, fatty acid, zinc oxide, peptizer, were used. The aromatic processing oil referred to in the following footnotes was composed of an aromatic content of about 40 percent, paraffinic content of about 36 percent and a naphthenic content of about 24 percent. The total aromatic oil (oil contained in the oil extended elastomers and additional oil added to the rubber composition) was about 44, 22, 22 and 14 phr, respectively, for Exp's A (the control), B, C and D.

1. An emulsion polymerization prepared styrene/butadiene copolymer elastomer having a styrene content of about 23.5 percent and a Tg of about −52° C. obtained from The Goodyear Tire & Rubber Company, oil extended with 37.5 phr of aromatic rubber processing oil.

2. A medium vinyl polybutadiene elastomer having a vinyl 1,2-content of about 45 percent and a Tg of about −55° C. obtained as Budene® 1255, oil extended with 37 phr of aromatic rubber processing oil, from The Goodyear Tire & Rubber Company. The rubber had a viscosity of about Mooney Large (ML-4) value of about 50.

3. A cis 1,4-polybutadiene elastomer having a high cis 1,4- content having and a Tg of about −100° C. obtained as Budene® 1254 from The Goodyear Tire & Rubber Company (oil extended with 20 phr of aromatic rubber processing oil).

4. A high cis polybutadiene, Budene® 1207 having a Tg of about −100° C. and obtained from The Goodyear Tire & Rubber Company.

5. Emulsion polymerization styrene/butadiene copolymer elastomer (E-SBR), containing 40 percent bound styrene (BS) and having a Tg of about −35° C. obtained from The Goodyear Tire & Rubber Company (oil extended with 37.5 phr of aromatic rubber processing oil).

6. Emulsion polymerization styrene/butadiene copolymer elastomer (E-SBR), containing 36 percent bound styrene (BS) and having a Tg of about −40° C. obtained from The Goodyear Tire & Rubber Company (oil extended with 37.5 phr of aromatic rubber processing oil).

7. Emulsion polymerization styrene/butadiene copolymer elastomer (E-SBR), containing 52 percent bound styrene (BS) and having a Tg of about −25° C. obtained from The Goodyear Tire a Rubber Company.

8. A cis 1,4-polyisoprene natural rubber, technical grade, having a Tg in a range of about −65° C. to about −70° C.

9. An N205 (ASTM designation) carbon black having an Iodine number of about 122 with a DBP value of about 115.

10. An N121 carbon black having an Iodine number of about 121, and a DBP value of about 132.

11. Aromatic processing oil reportedly having an aromatic content according to ASTM D2140 of about 40 percent with the remainder of the oil comprised of paraffinic and naphthenic content.

12. Accelerators as a weight ratio of 4 to 1 of N-cyclohexyl-2-benzothiazolesulfenamide (CBS) and tetramethyl thiuram disulfide (TMTD), respectively.

13. Accelerators as a weight ratio of 0.95 to 1 of hexamethylene tetramine and N-tert-butyl-2-benzothiaxolesulfenamide (TBBS), respectively.

EXAMPLE II

The prepared rubber compositions were cured at a temperature of about 150° C. for about 18 minutes and the resulting cured rubber samples evaluated for their physical properties (rounded numbers are reported herein) as shown in the following Table 2. The rubber composition samples A, B, C and D correspond to the experimental samples A, B, C and D of Example I.

TABLE 2

| Properties | Ex A (Cntrl) | Ex B | Ex C | Ex D |
|---|---|---|---|---|
| DIN abrasion (cm³ loss) | 78 | 49 | 43 | 51 |
| Rebound (%) at 23° C. (Zwick) | 33 | 32 | 34 | 36 |
| Rebound (%) at 100° C. (Zwick) | 51 | 49 | 49 | 51 |
| Ult. Elongation (%) | 631 | 534 | 528 | 533 |
| 300% Modulus, MPa | 6.2 | 9.2 | 8.9 | 8.8 |
| Tensile Strength, MPa | 17.4 | 17.3 | 16.6 | 17.0 |
| Hardness, RT | 60 | 67 | 67 | 64 |

Observation of the above physical properties of the rubber composites show significant improvement in DIN abrasion resistance (less rubber loss) for B, C, D compared to A. This is considered herein to be significant because it indicates, or at least suggests, improvements in tire treadwear resistance (less treadwear).

Examples B, C and D also have significantly higher modulus and hardness compared to A which is predictive of better tire handling and cornering when the rubber compositions are used as tire treads.

The rebound values at 23° C. are predictive of similar traction and the rebound values at 100° C. are predictive of similar rolling resistance for all of the rubber compositions, namely, Ex. A (control), Ex. B, Ex. C and Ex. D, when used as tire treads.

Rheometer data (150° C.) for the Samples A, B, C and D is reported herein in the following Table 3.

TABLE 3

| Properties | Ex A (Cntrl) | Ex B | Ex C | Ex D |
|---|---|---|---|---|
| Time for 1 point rise (minutes) | 6.7 | 7.7 | 7.2 | 7.7 |
| $T_{25}$ (minutes) | 8.3 | 10.9 | 10.8 | 10.7 |
| $T_{90}$ (minutes) | 13.2 | 17.9 | 17.8 | 16.5 |
| Delta torque (DN-m) | 25.3 | 28.6 | 28 | 29.2 |

The rheometer generated data indicates that the experimental cure system composed of the two accelerators provides a suitable degree of cure for a tire tread rubber composition, i.e. a $T_{90}$ of less than 20 minutes, and acceptable scorch safety (time for one point rise greater than 7 minutes and delta torque greater than 25). Tan. Delta values versus temperature for the sulfur cured rubber compositions (Ex. A and Ex. B) are reported in the accompanying Drawing.

BRIEF DESCRIPTION OF DRAWINGS

In the accompanying Drawing, the Tan. Delta curve for the Ex. A (control) rubber composition is shown by the dashed line and exhibits an apex of a single peak at about −40° C.; whereas the Tan. Delta curve for the Ex. B rubber composition is shown by the solid line and exhibits two distinct peaks with their apexes at about −18° C. and at −60° C., respectively. The presence of the two Tan. delta peaks is indicative of the aforesaid elastomer incompatibility in the rubber composition. The Tan. delta peak at the lower temperature (−60° C.) is indicative of relatively enhanced abrasion resistance and the second Tan. delta peak at the higher temperature (−18° C.) is indicative of relatively higher hysteresis for the rubber composition.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having a rubber tread where said tread is a rubber composition comprised of, based on 100 parts by weight of the tread rubber, (A) elastomers comprised of (i) about 25 to about 60 phr of styrene/butadiene copolymer elastomer having a styrene content in a range of about 30 to about 55 percent and a Tg within a range of about −15° C. to about −45° C., (ii) about 5 to about 40 phr of medium vinyl polybutadiene having a vinyl content in a range of about 40 to about 65 percent and a Tg within a range of about −45° C. to about −65C., (iii) about 20 to about 40 phr of cis 1,4-polybutadiene having a Tg within a range of about −95° C. to about −105C., and (iv) about 5 to about 30 phr of cis 1,4-polyisoprene having a Tg within a range of about −65° C. to about −70C., (B) about 60 to about 110 phr of carbon black reinforcing filler characterized by having an Iodine adsorption value in a range of about 116 to about 145 together with a DBP number in a range of about 115 to about 140 and (C) about 2 to about 30 phr of an aromatic processing oil having an aromatic content of at least 35 percent; wherein the Tg of the said cis 1,4-polybutadiene elastomer is at least 50° C. lower than the Tg of the said styrene/butadiene copolymer elastomer.

2. The tire of claim 1 Wherein the cure system for the said tread composition is comprised of about 0.7 to about 2.0 phr of sulfur and about 1.0 to about 3.5 phr of a combination of hexamethylene tetramine and N-tert-butyl-2-benzothiazole sulfenamide cure accelerators in a weight ratio of one accelerator to the other of about 0.90 to about 1.5 respectively.

3. A pneumatic rubber tire having a circumferential rubber tread where said tread is a rubber composition comprised of, based on 100 parts by weight of the tread rubber, (A) elastomers comprised of (i) about 25 to about 40 phr of emulsion polymerization prepared styrene/butadiene copolymer elastomer having a styrene content in a range of about 35 to about 55 percent and a Tg within a range of about −15° C. to about −45° C., (ii) about 15 to about 30 phr of medium vinyl polybutadiene having a vinyl content in a range of about 40 to about 65 percent and a Tg within a range of about −45° C. to about −65° C., (iii) about 20 to about 30 phr of cis 1,4-polybutadiene having a Tg in a range of about −95° C. to about −105° C., and (iv) about 10 to about 30 phr of cis 1,4-polyisoprene having a Tg within a range of about −65° C. to about −70° C., (B) about 65 to about 90, phr of carbon black reinforcing filler characterized by having an Iodine adsorption value in a range of about 110 to about 145 g/kg together with a DBP number in a range of about 110 to about 140 cm³/100 g, (C) about 5 to about 30 phr of an aromatic processing oil having an aromatic content of at least about 35 percent, and (D) a cure system comprised of about 0.7 to about 2.0 phr sulfur and about 1.0 to about 3.5 of cure accelerators composed of a combination of hexamethylene tetramine and N-tert-butyl-2-benzothiazole sulfenamide in a ratio of the accelerators in a range of about 0.9 to about 1.5, respectively; wherein the Tg of the said cis 1,4-polybutadiene elastomer is at least 50° C. lower than the Tg of the said styrene/butadiene copolymer elastomer; and wherein a graphical plot of Tan. delta versus temperature curve within a range of −90° C. to 10° C. for the rubber composition yields two peaks in the curve with one peak having its apex within a temperature range of −90° C. to −50° C. and a second peak having its apex within a temperature range of −30° C. to 10°C.

4. The pneumatic tire of claim 1 wherein said styrene/ butadiene copolymer elastomer is an emulsion polymerization prepared elastomer and said aromatic oil has an aromatic content in a range of about 35 to about 50 percent wherein the remainder of the oil is comprised of paraffinic and naphthenic content according to ASTM D2140; and wherein a graphical plot of Tan. delta versus temperature curve within a range of −90° C. to 10° C. for the rubber composition yields two peaks in the curve with one peak having its apex within a temperature range of −90° C. to −50° C. and a second peak having its apex within a temperature range of −30° C. to 10° C.

5. The pneumatic tire of claim 1 wherein said styrene/ butadiene copolymer elastomer is an organic solution polymerization prepared elastomer and said aromatic oil has an aromatic content in a range of about 35 to about 50 percent wherein the remainder of the oil is comprised of paraffinic and naphthenic content according to ASTM D2140; and wherein a graphical plot of Tan. delta versus temperature curve within a range of −90° C. to 10° C. for the rubber composition yields two peaks in the curve with one peak having its apex within a temperature range of −90° C. to −50° C. and a second peak having its apex within a temperature range of −30° C. to 10° C.

\* \* \* \* \*